(12) United States Patent
Brinson et al.

(10) Patent No.: US 12,085,897 B2
(45) Date of Patent: Sep. 10, 2024

(54) SUBTRACTIVE MANUFACTURING OF AN OVERSIZED MIM BLANK

(71) Applicant: Fossil Group, Inc., Richardson, TX (US)

(72) Inventors: Brad D. Brinson, San Francisco, CA (US); Sean E. Daley, San Jose, CA (US); Simon Wu, New Taipei (TW); Brad William Piercey, Oak Point, TX (US)

(73) Assignee: Fossil Group, Inc., Richardson, TX (US)

( * ) Notice: Subject to any disclaimer, the term of this patent is extended or adjusted under 35 U.S.C. 154(b) by 1111 days.

(21) Appl. No.: 16/518,711

(22) Filed: Jul. 22, 2019

(65) Prior Publication Data

US 2021/0026308 A1    Jan. 28, 2021

(51) Int. Cl.
| | | |
|---|---|---|
| *G04B 37/22* | (2006.01) | |
| *A44C 5/14* | (2006.01) | |
| *A44C 27/00* | (2006.01) | |
| *B22F 3/22* | (2006.01) | |
| *B22F 3/24* | (2006.01) | |

(Continued)

(52) U.S. Cl.
CPC ............. *G04B 37/22* (2013.01); *A44C 5/14* (2013.01); *A44C 27/002* (2013.01); *B22F 3/24* (2013.01); *B23C 1/16* (2013.01); *G04B 19/283* (2013.01); *B22F 3/225* (2013.01); *B22F 2003/247* (2013.01); *B22F 2301/35* (2013.01); *B22F 2998/10* (2013.01)

(58) Field of Classification Search
CPC ........ G04B 37/22; G04B 19/283; A44C 5/14; A44C 27/002; B22F 3/24; B22F 3/225; B22F 2003/247; B22F 2301/35; B22F 2998/10; B22F 3/1021; B23C 1/16; G05B 2219/45145; G05B 2219/45244; G05B 19/4097

See application file for complete search history.

(56) References Cited

U.S. PATENT DOCUMENTS

| | | |
|---|---|---|
| 4,696,577 A | 9/1987 | Muller et al. |
| 6,350,407 B1 | 2/2002 | Sakata et al. |

(Continued)

OTHER PUBLICATIONS

International Search Report and Written Opinion, PCT/US2020/042886, ISA:US, Oct. 15, 2020, 24 pp.

*Primary Examiner* — Anthony M Liang
*Assistant Examiner* — Danny N Kang
(74) *Attorney, Agent, or Firm* — Rutan and Tucker, LLP

(57) ABSTRACT

Each type of metal component part for two or more watch designs can be derived from instances of that corresponding type of MIM blank for that component part, which is formed from a same injection molding tool (respectively for each type of component part). An example instance of the MIM blank formed for a type of component part then has at least a portion of the instance of the MIM blank subtracted through a CNC milling process to form an interim shape and geometry of an instance of the type of component part for a given watch design. The CNC milling process can be applied to the MIM blank for that component part when the MIM blank is in its interim shape and geometry and has not yet been hardened to a finished shape and geometry of an instance of that type of component part for the watch design.

18 Claims, 9 Drawing Sheets

(51) Int. Cl.
*B23C 1/16* (2006.01)
*G04B 19/28* (2006.01)

(56) References Cited

U.S. PATENT DOCUMENTS

| | | | |
|---|---|---|---|
| 8,562,489 B2 | 10/2013 | Burton et al. | |
| 9,128,465 B2 | 9/2015 | Kawauchiya et al. | |
| 9,360,841 B1 | 6/2016 | Tolani | |
| 9,869,976 B2 | 1/2018 | Perko et al. | |
| 2018/0236548 A1 | 8/2018 | Ishimine et al. | |
| 2018/0343993 A1* | 12/2018 | Derrig | A44C 27/002 |

* cited by examiner

Start

A method of making metal component parts for a watch with a Metal Injection Molding (MIM) process
100

The Metal Injection Molding (MIM) process, with at least the inclusion of one or more sub processes, makes metal component parts for a watch. One or more of types of metal component parts can include i) a casing, ii) a bezel, iii) a buckle, iv) parts for a watch band, and v) any combination of these.
102

The MIM process uses additional sub processes to the instance of the MIM blank when in a not hardened state, such as any sub process of i) a cut die, ii) a press, iii) a hot wire, or iv) other sub process in addition to v) the subtractive CNC milling process to further form the interim shape and geometry of that instance of the metal component part in accordance with the specification of that watch design.
104

The MIM process forms instances of a MIM blank for a type of component part with an injection molding step with the same injection molding tool. The component metal parts for the watch are formed for two or more different watch designs that fit within the constraints of a size and shape of the instances of the same MIM blank and then are derived from instances of the same MIM blank using at least, a sub process of a CNC milling process, to achieve two different finished shapes and geometries of that part.
106

The MIM process makes instances of a type of metal component part for two or more different watch designs that can be derived from instances of a same MIM blank for that component part formed from the same injection molding tool.
108

Fig. 1A
Cont.

```
                              ( Cont. )
                                  ↓
```

The subtractive CNC milling process is applied to the instances of the MIM blank for the component parts when the instances of the same MIM blank are in their interim shape and geometry and have not yet been sintered and hardened to a finished shape and geometry of that instance of the component part for that watch design.

110

The MIM process applies any additional sub processes to the instance of the MIM blank when in a not hardened state, such as any of i) a cut die, ii) a press, iii) a hot wire, or other sub process to further form the interim shape, aesthetics, and geometry of that instance of the metal component part in accordance with the specification of that watch design.

112

The MIM process applies sintering process to harden the shape and geometry of the component part in accordance with the specification of the watch design to achieve the finished shape and geometry of the component part. A finished geometry and shape of the second instance of the type of component part in the second watch design differs from the geometry and shape of the first instance of the type of component part in the first watch design.

114

The manufacturing process may also use a subsequent process, including CNC milling, press, cut die, etc. to remove any extraneous material from the finished shape and geometry of that component part or insert aesthetics onto that component part after the finished shape and geometry of the component part has been sintered to harden in order to achieve a final hardened shape and geometry of that instance of the component part.

Creating two or more metal component parts where the finished geometry and shape of a first instance of the metal component part differs from the finished shape and geometry of a second instance of the metal component part even though these component parts come from instances of the same MIM blank formed from the same injection molding tool via the sub process when the MIM blank was not hardened.
<u>118</u>

Creating a watch with a printed circuit board module that contains a sensor, a battery, buttons, a crown sensor, etc. being put into a watch body with the metal component parts that are created and formed by the MIM process
<u>120</u>

Creating a watch with one or more springs and gears cooperating with a winding mechanism configured to control movement of hands on a watch face, where the springs and gears are put into a watch body with the metal component parts that are created and formed by the MIM process
<u>122</u>

Creating a watch with one or more springs and gears cooperating with a quartz crystal configured to control movement of hands on a watch face, where the springs and gears are put into a watch body with the metal component parts that are created and formed by the MIM process
<u>124</u>

```
                    ( End )
```

Fig. 1C

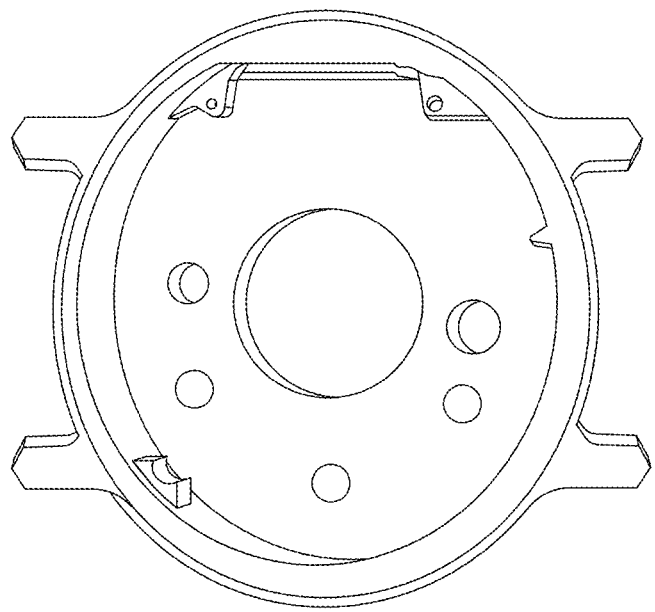
An Example Interim Shape And Geometry Of That Instance Of The Metal Component Part In Its Not Hardened State After Being Shaped Via At Least CNC Machining
440
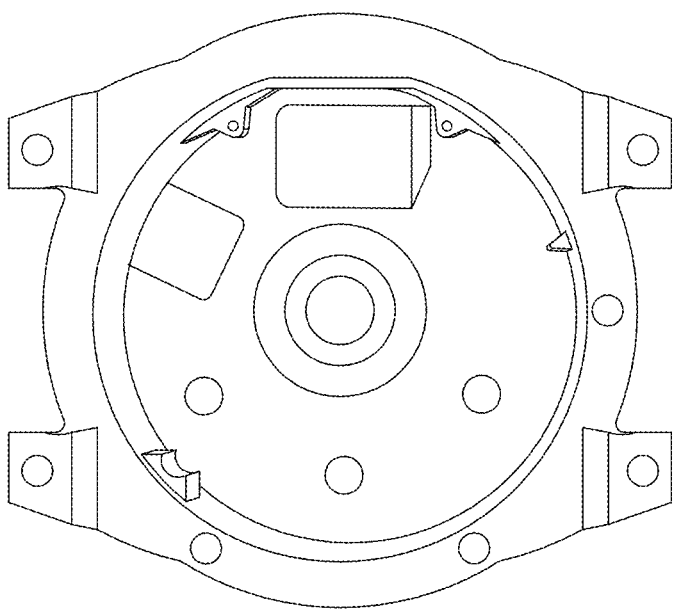
Example MIM Blank From The Tool
430
Figure 4

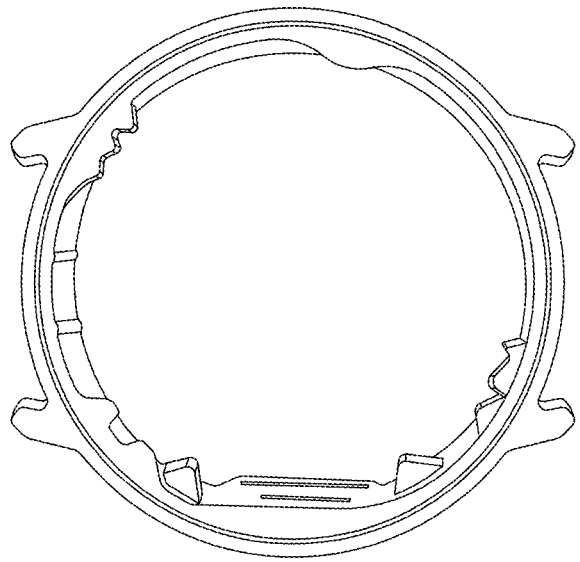
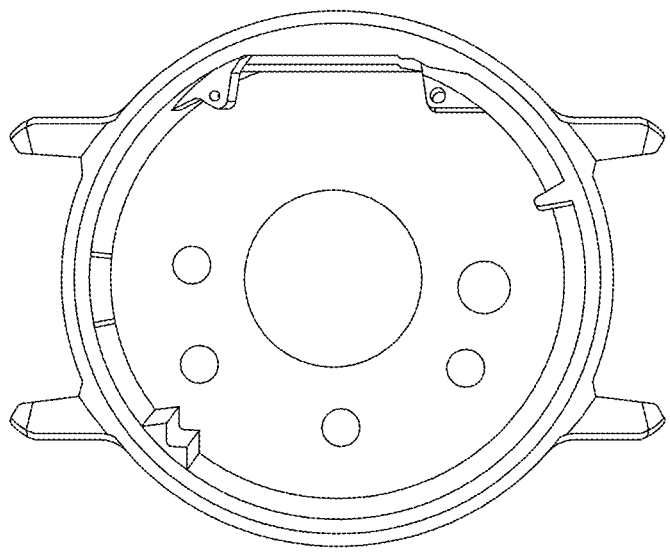
Figure 5

SUBTRACTIVE MANUFACTURING OF AN OVERSIZED MIM BLANK

FIELD

The design generally relates to wearable timekeeping devices, such as a watch.

BACKGROUND

Traditionally, watches can create their metal component parts in different ways. One prior art technique starts off with a hardened billet of steel and then form the metal part via stamping and machining that hardened billet into a final watch component part.

SUMMARY

In general, a wearable time keeping device is discussed. In an embodiment, a method of making metal component parts for a watch with a Metal Injection Molding (MIM) process is discussed. The example types of metal component parts can include i) a casing, ii) a bezel, iii) a buckle, iv) parts for a watch band, and v) any combination of these. Each type of metal component part for two or more watch designs can be derived from instances of that corresponding type of MIM blank for that component part, which is formed from a same injection molding tool (respectively for each type of metal component part). An example instance of the MIM blank formed for a type of metal component part then has at least a portion of the instance of the MIM blank subtracted through a Computer Numerical Control (CNC) milling process to form an interim shape and geometry of an instance of the type of component part for a given watch design. At least the sub process of the subtractive CNC milling process can be applied to the instance of the MIM blank for that type of component part when the instance of the same MIM blank is in its interim shape and geometry and has not yet been sintered and hardened to a finished shape and geometry of an instance of that type of metal component part for the watch design.

Likewise an embodiment of a MIM production line for making a metal component part for a wearable time keeping device is discussed. A same injection molding tool makes instances of a MIM blank for that type of metal component part. One or more sub process stations at least include a CNC milling station. The metal component part can include i) a casing, ii) a bezel, iii) a buckle, iv) parts for a watch band, and v) any combination of these.

An instance of the metal component part corresponding to one of the types of metal component parts is made from an instance of the MIM blank for that metal component part formed from the injection molding tool. The instance of the MIM blank for that metal component part has had at least a portion of the instance of the MIM blank subtracted through CNC milling at the CNC milling station to form an interim shape and geometry of the metal component part when not in a hardened state, and then the instance of the MIM blank for that metal component part went through a sintering process at a sinter station to then harden a finished shape and geometry of the metal component part. A size and shape of the instance of the MIM blank is formed such that the metal component part is derivable from the instance of the MIM blank using at least, the sub process of the CNC milling process, to achieve two different finished shapes and geometries of the metal component part in accordance with specifications of two or more different wearable time keeping device designs.

These and other designs are discussed.

BRIEF DESCRIPTION OF THE DRAWINGS

The multiple drawings refer to the example embodiments of the design.

FIGS. 1A-1C illustrate a flow diagram of an embodiment of an example Metal Injection Molding (MIM) process, with at least the inclusion of one or more sub processes, to make metal component parts for a watch where instances of example component parts are customized in shape and geometry of the component part while not in its hardened shape (e.g. a green state) to achieve an interim shape and geometry of that instance of the component part.

FIG. 4 illustrates a side by side comparison diagram of an embodiment an instance of an example MIM blank from the injection molding tool as well as an example interim shape and geometry of that instance of the metal component part in its not hardened state after being shaped via at least CNC machining in accordance with the specification of that watch design.

FIG. 5 illustrates a side by side comparison diagram of an embodiment an instance of an example finished hardened state of the example component part, such as a watch casing, after sintering of the component part as well as the example component part in a final shape, geometry and/or ascetics corresponding to the specific specifications for that instance ID of a given watch design.

Figure 2:
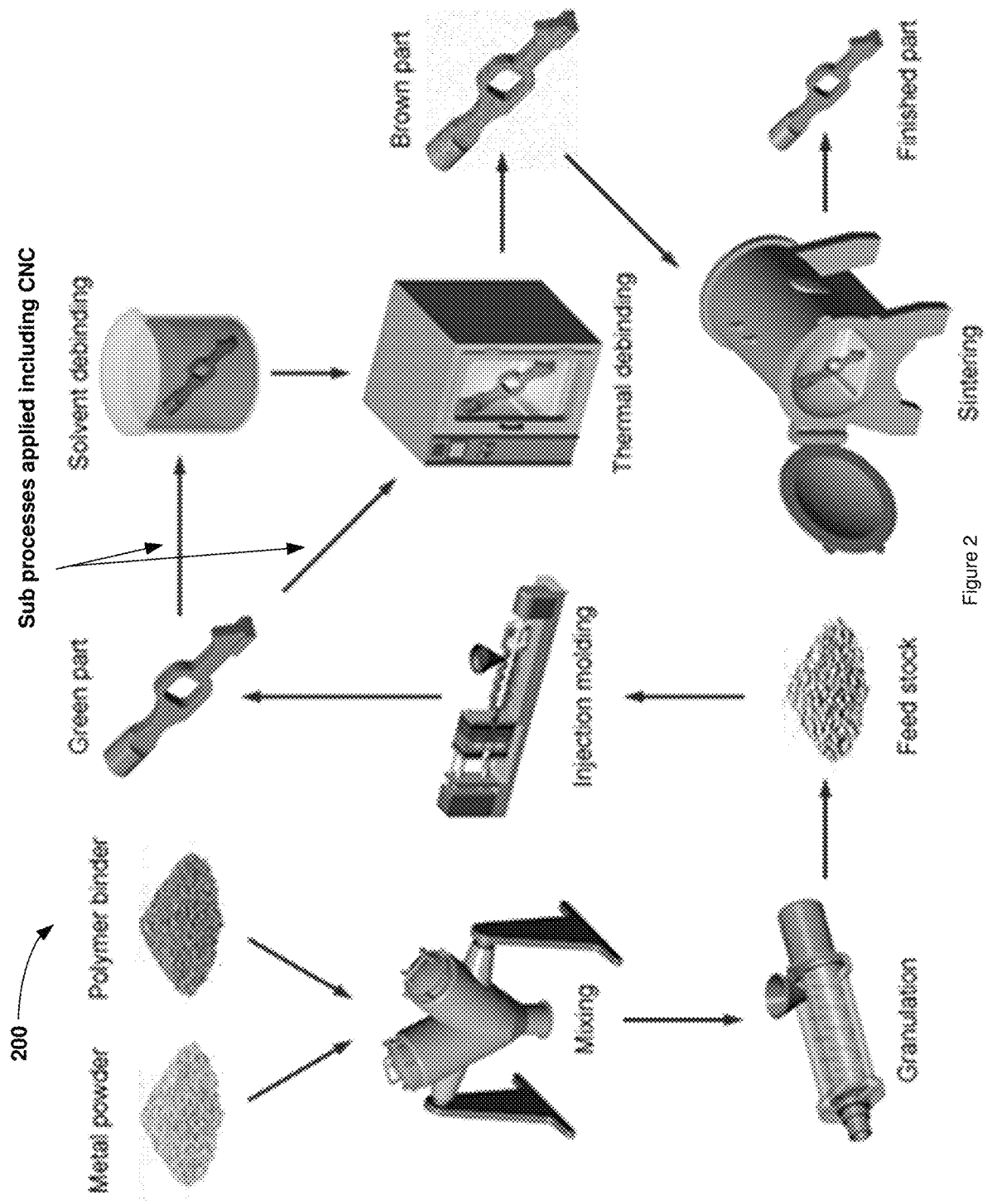
FIG. 2 illustrates a flow diagram of an embodiment of an example MIM process with a CNC milling sub process to make metal component parts for a watch where instances of example component parts are customized in finished geometry and shape for different watch designs.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of wearable time keeping devices, named components, connections, number of seals, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Further, specific numeric references such as first enclosure, may be made. However, the specific numeric reference should not be interpreted as a literal sequential order but rather interpreted that the first enclosure is different than a second enclosure. Thus, the specific details set forth are merely exemplary. The specific details discussed in one embodiment may be reasonably implemented in another embodiment. The specific details may be varied from and still be contemplated to be within the spirit and scope of the present design.

The following drawing and text describe various example implementations of the design.

FIGS. 1A-1C illustrate a flow diagram of an embodiment of an example Metal Injection Molding (MIM) process, with at least the inclusion of one or more sub processes, to make metal component parts for a watch where instances of example component parts are customized in shape and geometry of the component part while not in its hardened shape (e.g. a green state) to achieve an interim shape and geometry of that instance of the component part.

In step 100, the MIM process, with at least the inclusion of one or more sub processes, makes metal component parts for a watch.

In step 102, one or more of types of metal component parts can include i) a casing, ii) a bezel, iii) a buckle, iv) parts for a watch band, and v) any combination of these.

In step 104, the MIM process uses additional sub processes to instances of the MIM blank when in a not hardened state, such as any sub process of i) a cut die, ii) a press, iii) a hot wire, or iv) other sub process in addition to v) the subtractive CNC milling process to further form the interim shape and geometry of that instance of the metal component part in accordance with the specification of that watch design.

In step 106, the MIM process forms instances of a MIM blank for a type of component part with an injection molding step with the same injection molding tool. The component metal parts for the watch are formed for two or more different watch designs that fit within the constraints of a size and shape of the instances of the same MIM blank and then are derived from instances of the same MIM blank using at least, a sub process of a CNC milling process, to achieve two different finished shapes and geometries of that part.

In step 108, the MIM process makes instances of a type of metal component part for two or more different watch designs that can be derived from instances of a same MIM blank for that component part formed from the same injection molding tool.

In step 110, the subtractive CNC milling process is applied to the instances of the MIM blank for the component parts when the instances of the same MIM blank are in their interim shape and geometry and have not yet been sintered and hardened to a finished shape and geometry of that instance of the component part for that watch design. The subtractive CNC milling process on the instance of the MIM blank removes and/or shapes portions of that component in accordance with its watch design. For example, a first instance of the MIM blank formed for the first type of metal component part can have at least a portion of the first instance of the MIM blank subtracted through a Computer Numerical Control (CNC) milling process to form an interim shape and geometry of a first instance of the first type of component part for a first watch design. Likewise, an interim shape and geometry of a second instance of the first type of component part from a second instance of the MIM blank for a second watch design can be formed with the subtractive CNC milling process. Each CNC milling process would use a different CNC sequence for the subtractive CNC milling process according to the watch design specifications. The finished geometry and shape of the first instance of the first type of component part differs from a finished shape and geometry of the second instance of the first type of component part even though these component parts come from instances of the same MIM blank formed from the same injection molding tool. This customization of roughly similar component metal parts for different watch design can occur for many, many different watch designs.

In step 112, the MIM process applies any additional sub processes to the instances of the MIM blank when in a not hardened state, such as any of i) a cut die, ii) a press, iii) a hot wire, or other sub process to further form the interim shape, aesthetics, and geometry of that instance of the metal component part in accordance with the specification of that watch design.

In step 114, the MIM process applies a sintering process in a sinter station to harden the shape and geometry of the component part in accordance with the specification of the watch design to achieve the finished shape and geometry of the component part. A finished geometry and shape of the second instance of the type of component part in the second watch design differs from the geometry and shape of the first instance of the type of component part in the first watch design. The MIM process may use alternative processes to harden the interim shape, aesthetics, and geometry of that instance of the metal component after the sub processes have formed the interim shape, aesthetics, and geometry of that instance of the metal component.

In step 116, the manufacturing process may also use one or more subsequent processes, including CNC milling, press, cut die, etc. to remove any extraneous material from the finished shape and geometry of that component part and/or insert aesthetics onto that component part after the finished shape and geometry of the component part has been sintered to harden in order to achieve a final hardened shape and geometry of that instance of the component part. However, the removal of material and shaping of the component part while in its not hardened shape to achieve an interim shape and geometry of that instance of the component part saves a large amount of time, money, and specialization of many other manufacturing steps to achieve the final hardened shape and geometry of that instance of the component part. As in traditional metal component parts in a finished hardened stage, the component part may need be to softened from its harden state to a point to remove additional material and/or shape the metal component part and/or insert aesthesis on that metal component part.

In step 118, the manufacturing process further creates two or more metal component parts where both the finished and final geometry and shape of a first instance of the metal component part differs from the finished and final shape and geometry of a second instance of the metal component part even though these component parts come from instances of the same MIM blank formed from the same injection molding tool and various sub process when that instance of the MIM blank was not hardened.

In step 120, the manufacturing process further assembles parts to create a digital watch with a printed circuit board module that contains a sensor, a battery, buttons, a crown sensor, etc. being put into a watch body with the metal component parts that are created and formed by the MIM process.

In step 122, the manufacturing process further creates a watch with a watch face, one or more springs and gears cooperating with a winding mechanism configured to control movement of hands on the watch face, where the springs and gears are put into a watch body with the metal component parts that are created and formed by the MIM process.

In step 124, the manufacturing process further creates a watch with a watch face, a battery, one or more springs and gears cooperating with a quartz clock configured to control movement of hands on the watch face, where the springs and gears are put into a watch body with the metal component parts that are created and formed by the MIM process.

FIG. 2 illustrates a flow diagram of an embodiment of an example MIM process with a CNC milling sub process to make metal component parts for a watch where instances of example component parts are customized in finished geometry and shape for different watch designs.

The MIM process 200 makes metal component parts for a watch with a CNC milling sub process to make metal component parts. The one or more types of metal component parts can include i) a casing, ii) a bezel, iii) a buckle, iv) parts for a watch band, and v) any combination of these. The MIM process 200 can be a metalworking process that uses finely-powdered metals combined with binder material (e.g. plastic) to create a molten feedstock that can be injected into a mold cavity to form a complex shape. The MIM process 200 is different from prior techniques of mere forging of metal parts or mere metal stamping of a hardened billet of metal.

In this example MIM process 200, metal powder and a polymer binder are mixed in a mixer. These can then go through a granulator. A feedstock is added. An instance of the MIM blank for a component part is formed with this injection molding step with the injection molding tool. The injection molding tool then creates instances of a MIM blank for a component part in a green state. The instance of the MIM blank as a green part is made large enough to later make customizations via the sub processes in accordance with an instance watch design ID. This MIM process 200 at least uses at least a sub process of a CNC milling station, to move away from progressive metal stamping, to at least CNC milled parts, which unlocks massive customization of instances of component parts for different watch design IDs from a same injection molding tool. The metal component part is made from the instance of the MIM blank for that component part formed from the injection molding tool. Another sub process tool station using i) a cut die, a press, etc. can be used to form and customize the interim shape and geometry of the first instance of the metal component part in addition to ii) the CNC milling station to further form the interim shape and geometry of the first instance of the metal component part when the first instance of the metal component part has not yet been sintered. The instance of a customized metal component part in a green state can go through solvent debinding and/or thermal debinding to become an instance of a component part in a brown state. The instance of a component part in a brown state goes through a sintering process to harden the component part to a finished state. Multiple sub processes can be applied to form the interim shape, geometry, and/or aesthetics of that component part, such as a green part or brown part. The CNC process is applied to each instance of a MIM blank in a green state, brown state,/not hardened component part, to at least subtract a portion of the MIM blank through CNC machining to achieve a specific aesthetic, shape, and geometry of that component part to conform to a finished shape and geometry of that part in a given watch ID design.

A size and shape of the instance of the MIM blank is formed such that the metal component part is derivable from the instance of the MIM blank using at least, the sub process of the CNC milling process, to achieve at least two or more different finished shapes and geometries of the component part in accordance with specifications of two or more different watch designs. Thus, multiple different finished shapes and geometries of bezels may come from a same instance of a MIM blank of that component. Thus, multiple different finished shapes and geometries of casings may come from a same instance of a MIM blank of that component. Similar examples go on, etc. etc.

The customization of the MIM blank allows for a common set of the internal mechanical features the i) PCBA module, ii) battery, and/or iii) other internal parts of a watch to interface with the metal component parts. This allows for the repeatability of the internal mechanical features while customization of the metal component parts. For example, a CNC machining from a MIM Blank allows flexibility with creating a new external geometry but keep the internal detail mechanical interface details the same.

A same manufacturing production line for making a type of metal component part can be used to make many, many different instances with different geometries, aesthetics, and shapes for different watch designs. At least the subtractive CNC milling process is applied to an instance of the MIM blank for the type of component part to customize that instance of the same MIM blank when it is in its interim shape and geometry and has not yet been sintered and hardened to a finished shape and geometry of that component part. For example, a first watch design has a customized shape and geometry with its metal parts compared to a second watch design even though both are manufactured with a same injection molding tool process and derived from the same MIM blank. The customizations can be made with the CNC station and then use another sub process i) a hot wire, ii) stamping—cut die, a press, etc., or other mechanism to remove/shape more material from the MIM blank to eventually form a final shape and geometry of the part after sintering. At least the sub processes remove and shape material from an instance of the MIM blank of a first type of component part to form the interim shape and geometry of this instance of the first type of component part when the first instance of the part in the MIM blank form is still not in a hardened state. Note, the not hardened state for the MIM blank is when the MIM blank of the first component part is in a very soft state compared to a final sintered state of that first component part or a final steel billet of that part, which allows significant time savings in the removal of material or insertion of an aesthetic design onto that component part.

Again, the instance of the MIM blank for the component part is made oversized to allow removal of material to the smaller finished geometry and shape after sintering. With a prior MIM process, the general desired shape or net shape of a component part is determined after the injection molding process. With this MIM process 200 using at least a CNC sub process, the need for a custom injection mold MIM tool for every new shape on a watch design would not be needed. This greatly reduces the tooling cost and the lead time for creating a new MIM injection mold tool for new watch shapes. This provides manufacturing flexibility to create new and different instances of a type of component part, such as watch case with external aesthetics and/or geometries quickly and without the investment in a new MIM injection molding tooling. For example, milling to remove material while not in a hardened state can eliminate a major portion of the prior technique of forging a component part to a finished hardened state and then CNC machining.

Thus, in the case of a digital watch, the display, the watch programs, and other internal mechanical feature can remain the same for multiple different watch ID designs, where of all these platforms are using the same or similar technology. What can define a specific digital watch's technology platform is the internal PCBA module and display type. There is generally a standard PCBA module that contains the sensor, battery, buttons, crown sensor, hardware, etc. The MIM injection molding process would allow for these standard internal mechanical features to be formed with the MIM injection molding tool. The same goes for more traditional analog watch designs. However, the external geometry, shape, and aesthetics of each different watch design can significantly differ via the MIM with at least the CNC milling sub process.

With the current watch manufacturing process of forging and CNC machining, all of these internal and external mechanical features generally have to be CNC machined or re-forged after the finished shape is hardened. Forming the majority of all these mechanical changes to a watch design with the MIM injection process with one or more sub processes on a non-hardened MIM blank greatly reduces the CNC machining times on post finished state component parts. The MIM blank as, for example, a green part is much softer than the finished component part in a post-sinter state. The prior process of forging and CNC machining of a hardened metal billet that the component part is very difficult and time-consuming. In this prior technique, the metal billet after being forged into the near net shape has to be first annealed to soften the metal back to a workable state and then worked on.

In contrast, the CNC machining of material of, for example, a green-state part is much faster and easier given the softness of the green-state part compared to the steel billet. This CNC machining of component parts in, for example, a green state saves time, multiple post processing steps; and thus, the final cost for the finished component part, such as a case or bezel. In addition, the external aesthetic features can also be machined or imprinted in a soften state to allow for great manufacturing flexibility. For each different watch design, the MIM process 200 with sub processes can quickly change or update the external surface to create a different looking watch without making a new MIM tool or forging tool. This flexibility gives the MIM process 200 with sub processes the ability to create new shapes to differentiate the watch.

Figure 3:
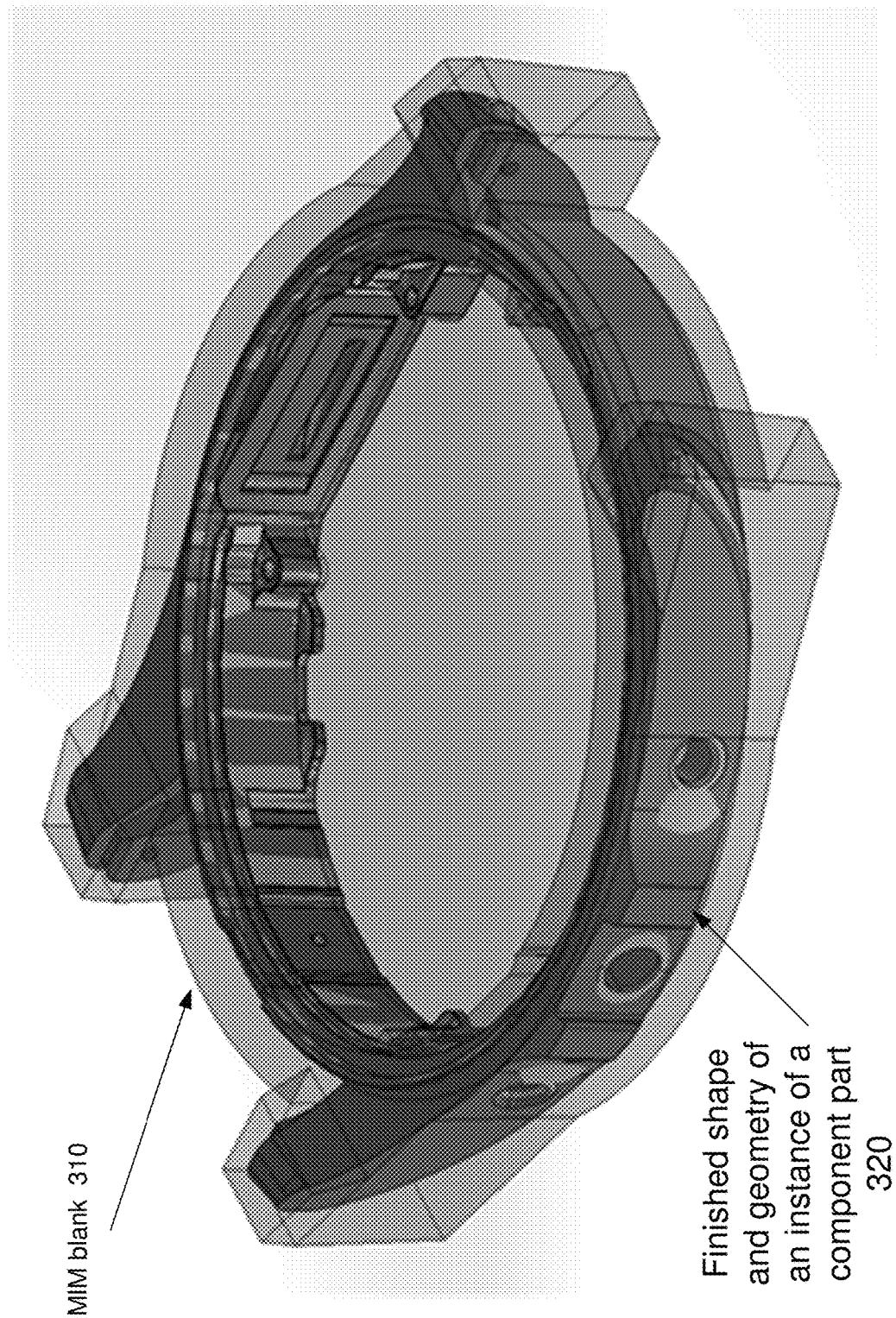
FIG. 3 illustrates a diagram of an embodiment of an example overlay of an instance of the MIM blank in a green state and not hardened from the injection molding tool that is big enough to be customized to form many different finished aesthetics, shapes, and/or geometries, via at least some CNC machining of that component part, in accordance with different watch designs.

FIG. 3 illustrates a diagram of an embodiment of an example overlay of an instance of the MIM blank in a green state and not hardened from the injection molding tool that is big enough to be customized to form many different finished aesthetics, shapes, and/or geometries, via at least some CNC machining of that component part, in accordance with different watch designs.

The shadowy overlay of the MIM Blank 310 as a green part from the injection molding tool is shown. The MIM Blank 310 is big enough to be customized to form many different finished aesthetics, shapes, and/or geometries, via at least some CNC machining of that component part, in accordance with different watch designs. The material removed and/or shaping of the instance of the MIM Blank 310 in green state, via sub processes, to achieve the finished aesthetic, shape, and/or geometry of metal component part 320. The finished aesthetic, shape, and/or geometry of metal component part 320 is also shown but within the overlay of the MIM blank 310.

FIG. 4 illustrates a side by side comparison diagram of an embodiment an instance of an example MIM blank from the injection molding tool as well as an example interim shape and geometry of that instance of the metal component part in its not hardened state after being shaped via at least CNC machining in accordance with the specification of that watch design.

On the left side, an example instance of a MIM blank 430 for that example metal component part from the injection molding tool is shown. On the right side, an example instance of a metal component part derived from the MIM blank for that example component part in the form of an interim shape and geometry of an instance of the metal component part 440.

The MIM Blank 430 from the injection molding tool has at least the CNC milling station remove a majority of the material from the green state component before the component is hardened via sintering. Although the majority of the material is removed, some extra material must remain in the interim shape and geometry of an instance of the metal component part 440 to maintain its shape and/or make handling in process steps easier, until the component part reaches its final shape and geometry.

Thus, at least the sub process of the subtractive CNC milling process is applied to the instance of the MIM blank 430 for that type of component part when the instance of the MIM blank has not yet been sintered and hardened to a finished shape and geometry of the component part for the watch design. Multiple different finished geometries and shapes of instances of the component part can be made even though these component parts come from instances of the same MIM blank 430 formed from the same injection molding tool on a same manufacturing line.

FIG. 5 illustrates a side by side comparison diagram of an embodiment an instance of an example finished hardened state of the example component part, such as a watch casing, after sintering of the component part as well as the example component part in a final shape, geometry and/or ascetics corresponding to the specific specifications for that instance ID of a given watch design.

The finished shape and geometry of the instance of the component part 550 for a watch design after sintering (shown on the left) will then go through some subsequent processing after being hardened to achieve a final hardened shape and geometry of that instance of the component part 560 (shown on the right). Again, different instances of a same MIM blank can be processed to create, for example, two casings with different finished shapes and geometries; and thus, different final shapes and geometries.

As an example, the metal component part could be a bezel being produced by the injection molding tool. A first instance of a MIM blank for bezel can be formed with the injection molding tool for a first watch design, and then the sub processes create at least a portion of a shape and geometry of an interim shape and geometry of the first bezel for the first watch design with the subtractive CNC milling process when the first instance of the MIM blank has not yet been sintered to harden a finished shape and geometry of the first bezel. Likewise, a second instance of a MIM blank for bezel can be formed with the injection molding tool for a second watch design, and then the sub processes create at least a portion of a shape and geometry of an interim shape and geometry of the second bezel for the second watch design with the subtractive CNC milling process when the second instance of the MIM blank has not yet been sintered to harden a finished shape and geometry of the second bezel.

The MIM process sinters the shape and geometry of the first and second bezels to harden them. The manufacturing process may using subsequent processes to remove any extraneous material from the finished state and geometry of the first and second bezels, in accordance with their respective watch designs after being hardened in order to achieve a final hardened shape and geometry of that bezel. The MIM process with one or more sub process may create multiple different instances of a metal component part for multiple different watch ID designs, which can be used in creating both digital watches and analog watches.

Analog watches may contain a watch face and one or more springs and gears configured to control movement of hands on the watch face. The springs and gears are put into a watch body with the metal component parts that are created and formed by the MIM process. Analog watches can be driven be a quartz clock and battery or by a winding mechanism cooperating with a spring.

A watch time movement can be the engine of a watch that acts as the powerhouse to make the watch and its functions work. This internal mechanism inside the timepiece moves the hands on a watch face and powers any complications such as a chronograph, annual calendar or a dual time zone. Driving all of the timekeeping functions, the watch time movement is the essential component in a watch and keeping accurate time; a watch would not function without it.

There are different watch time movements that will fall into one of three categories quartz, or mechanical and automatic time movements.

On a quartz watch, the second hand has the tick-tick motion that moves once per second while mechanical watches have a smooth, sweeping seconds motion. Quartz movements are very accurate, battery powered, and require minimal maintenance aside from battery replacements. A quartz movement utilizes a battery as its primary power source. To create power in quartz watch movements, a battery sends an electrical current through a small quartz crystal, electrifying the crystal to create vibrations. These vibrations keep the movement oscillating and drive the motor to move the watch hands.

Mechanical movements contain an intricate series of tiny components working together to power the timepiece. A mechanical movement uses energy from a wound spring, rather than a battery, to power the watch. This spring stores energy and transfers it through a series of gears and springs, regulating the release of energy to power the watch. Manual-wind watches have to be manually wound by hand to create energy in the watch's mainspring. The wearer must turn the crown multiple times to wind the mainspring and store potential energy. The mainspring will unwind slowly and release energy through a series of gears and springs that regulate the release of energy. This energy is then transferred to turn the watch hands and power the watch's complications.

Another form of mechanical movements are automatic time movements. Often referred to as "self-winding", automatic movements harness energy through the natural motion of the wearer's wrist. Kinetic energy from the wearer's wrist is transferred automatically to drive the mechanisms inside the watch. The mainspring is automatically wound from the natural movements of the wearer's wrist. An automatic movement works largely the same way that manual movements do, with the addition of a metal weight called a rotor. The rotor is connected to the movement and it can rotate freely. The rotor spins with each movement of the wrist, transferring the energy to the mainspring. The mainspring is automatically wound as a result of this energy transfer.

An example wearable time keeping digital device, such as a digital watch, may have a display, one or more processors, one or more memories sensors and other functions on a printed circuit board, one or more batteries, and metal component parts. The wearable time keeping digital device may include various components including a housing with a display screen. One or more processors are located in the housing. Various metal component parts and other parts may be assembled to form the housing. The processor is configured to process commands to present an onscreen display on the display screen to enable the wearer of the electronic device to select a number of different operations. One or more non-transitory computer readable storage mediums in the housing are accessible to the processor for storing instructions executable by the processor to generate the number of different operations on the onscreen display. A communication circuit is located in the housing. One or more rechargeable batteries are used for the wearable time keeping device. The watch may display electronic hands and/or may have mechanical hands.

Again, the wearable time keeping digital device electronic may be a smart watch or smart activity tracker. The communication circuit of the wearable time keeping digital device may use NFC communications (active and passive), Bluetooth, Zigbee, have cellular connectivity (e.g. 3G/4G/5G/), Wi-Fi, etc. to another computing device cooperating with the wearable time keeping device.

Figure 6:
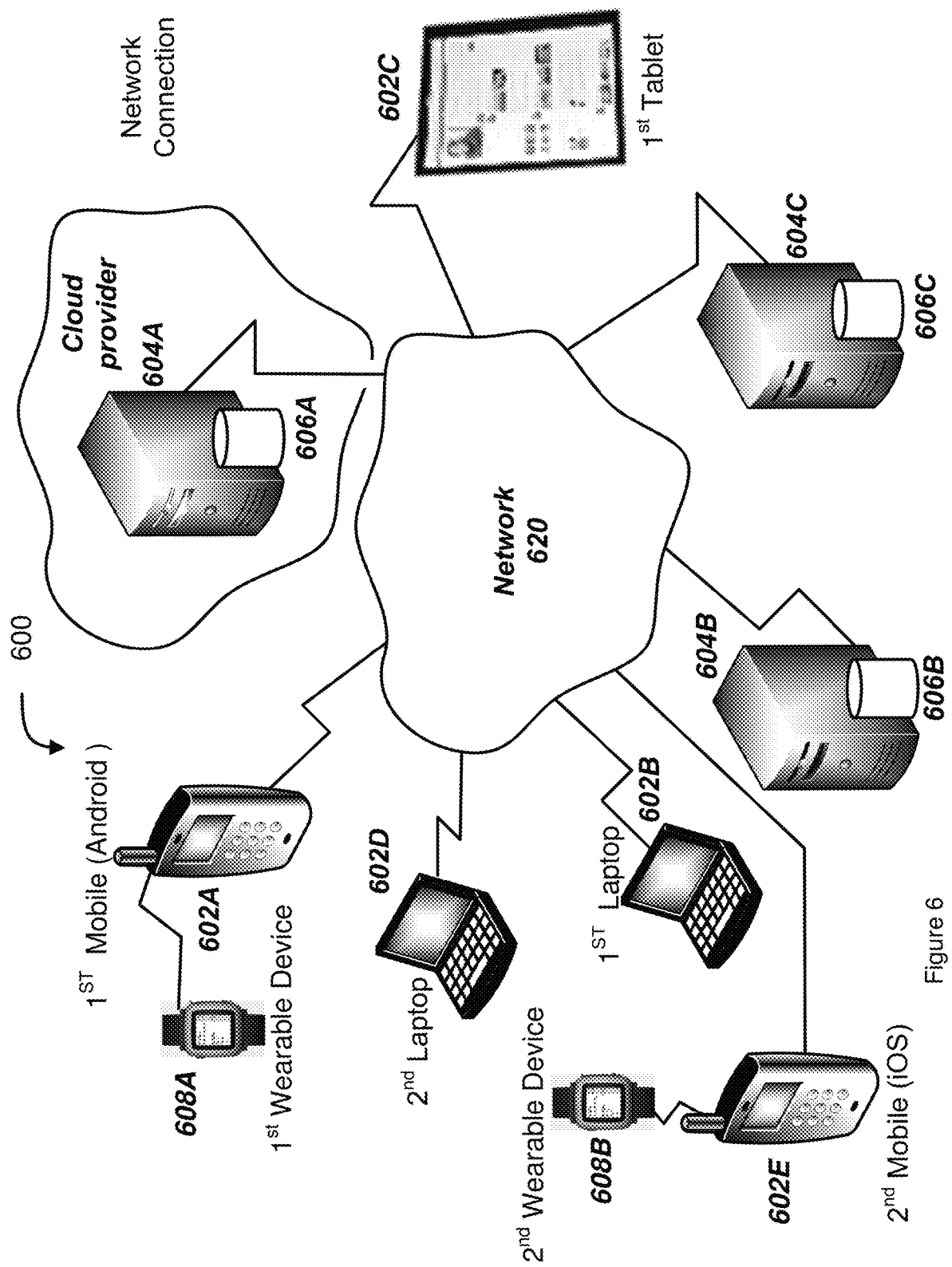
FIG. 6 illustrates a diagram of a network environment in which the wearable time keeping device and techniques described herein may be applied.
Figure 7:
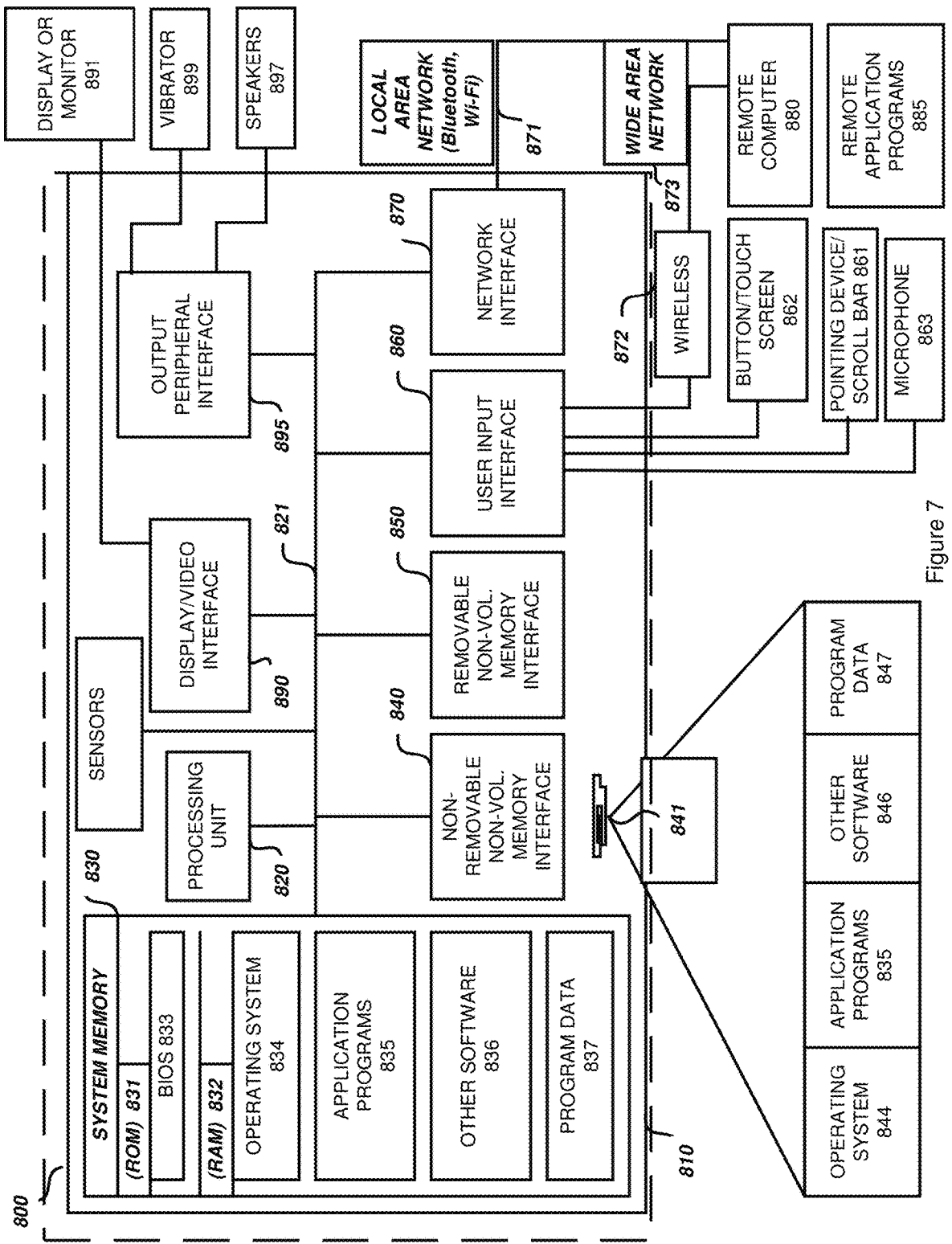
FIG. 7 illustrates a block diagram of an example computing system that may be used in an embodiment of one or more of the servers, wearable time keeping digital devices, and client devices discussed herein.

In general, the wearable time keeping device includes one or more communication and processing systems, which can be coupled externally to one or more networks. FIGS. 6-7 illustrate additional example environments to implement the concepts. The housing also has a computer readable storage medium in the housing accessible to the processor for storing instructions executable by the processor to generate the number of different operations on the onscreen display.

FIG. 7 illustrates a block diagram of an example computing system that may be used in an embodiment of one or more of the servers, wearable time keeping digital devices, and client devices discussed herein. The computing system environment 800 is only one example of a suitable computing environment, such as a client device, server, wearable time keeping device, etc., and is not intended to suggest any limitation as to the scope of use or functionality of the design of the computing system 810. Neither should the computing environment 800 be interpreted as having any dependency or requirement relating to any one or combination of components illustrated in the exemplary operating environment 800.

In an embodiment, the wearable time keeping device can connect through a wireless network to an app store having thousands of applications and watch faces that can be downloaded. The applications include notifications for emails, calls, text messages & social media activity; stock prices; activity tracking (movement, sleep, estimates of calories burned); remote controls for smartphones, cameras & home appliances; turn-by-turn directions (using the GPS receiver in a smartphone or tablet); display of RSS or JSON feeds; and also include hundreds of custom watch faces.

In an embodiment, the wearable time keeping device can originally be shipped with applications pre-installed. These applications can use data received from a connected phone for distance, speed and range information. The applications can also directly connect to a backend server on the cloud. More applications are downloadable via a mobile phone or tablet.

In an embodiment, the wearable timekeeping devices can integrates with any phone or tablet application that sends out native iOS or Android notifications.

The wearable time keeping device also has a computer readable storage medium, e.g., solid-state memory 840, in the housing accessible to the processor 820 and stores instructions executable by the processor to generate the number of different operations on the onscreen display 891.

In an embodiment, the wearable time keeping device is a wristwatch that has a watch housing in which the onscreen display bears a time indication, either digital or analog. In certain instances, the wristwatch may be a smart watch. In one embodiment, the wristwatch has one or more manipulatable physical buttons that are arranged on the housing of the watch. In other embodiments, the wristwatch may have a touch screen, scrolling device, additional buttons or a combination of some or all of these. A flexible wristband is engagable with the housing of the watch to hold the housing of the watch onto a wearer.

In an embodiment, the electronic wearable device has a bezel coupled to the display screen as well has a lithium based battery. The lithium-based battery is located in the housing. In one embodiment, the lithium-based battery has at least 130 milliampere-hour (mAh) in electrical storage capacity, and can power the electronic components in a wearable time keeping device. The lithium-based battery can also power the display screen, the communication circuit, and the processor. The display screen can be selected from the group of any of an ePaper display, a monochrome LCD display, and a color LED backlit display, and OLED display, that all consume lower battery power than some other color LCD screens. The battery contains enough capacity of at least 130 mAh to allow the display screen to stay on constantly and last up to multiple days on a single charge of the battery.

In an embodiment, the wearable time keeping device is a smart watch which features a LCD display screen, a programmable CPU, memory, storage, Bluetooth, a vibrating motor, a heart rate sensor, GPS, and an accelerometer. These features extend the smart watch's use beyond just displaying the time on the display screen and into many roles including interacting with smartphone notifications, activity tracking, gaming, map display, golf tracking, and more. The smart watch is compatible with Android and iOS devices. When connected to one of these devices via Bluetooth, the smart watch can (but may not need to) pair with that device and vibrate and display text messages, fitness information, emails, incoming calls, and notifications from social media accounts. The smart watch can also act as a remote control for the telephone function in the paired device, or for other paired devices containing a camera such as the GoPro.

Computing System

With reference to FIG. 7, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine-readable media. Computing machine-readable media can be any available media that can be accessed by computing system 810 and includes both volatile and nonvolatile media, removable and non-removable media. By way of example, and not limitation, computing machine-readable mediums uses include storage of information, such as computer readable instructions, data structures, other executable software or other data. Computer storage mediums include, but are not limited to, RAM, ROM, EEPROM, flash memory or other memory technology, or any other tangible medium which can be used to store the desired information and which can be accessed by computing device 800. Transitory media such as wireless channels are not included in the machine-readable media. Communication media typically embodies computer readable instructions, data structures, other executable software, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 13 illustrates that RAM can include a portion of the operating system 834, other executable software 836, and program data 837.

The computing system 810 may also include other removable/non-removable volatile/nonvolatile computer storage media. By way of example only, FIG. 13 illustrates a solid-state memory 841. Other removable/non-removable, volatile/nonvolatile computer storage media that can be used in the exemplary operating environment include, but are not limited to, USB drives and devices, flash memory cards, solid state RAM, solid state ROM, and the like. The solid-state memory 841 is typically connected to the system bus 821. In an example, the wearable time keeping device can have RAM which can include some space for the OS, 24 some space for the applications, and some space for the services.

As an example, the computer readable storage medium 841 stores Operating System software for smart watches to cooperate with both Android OS and iOS.

The drives and their associated computer storage media discussed above and illustrated in FIG. 7, provide storage of computer readable instructions, data structures, other executable software and other data for the computing system 810. In FIG. 7, for example, the solid state memory 841 is illustrated for storing operating system 844, other executable software 846, and program data 847. Note that these components can either be the same as or different from operating system 834, other executable software 836, and program data 837. Operating system 844, other executable software 846, and program data 847 are given different numbers here to illustrate that, at a minimum, they are different copies.

A user may enter commands and information into the computing system 810 through input devices such as a keyboard, touchscreen, or even push button input component 862, a microphone 863, a pointing device and/or scrolling input component 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a display and video interface 890. In addition to the monitor, computing devices may also include other peripheral output devices such as speakers 897 and other output device, which may be connected through an output peripheral interface 890.

The computing system 810 may operate in a networked environment using logical connections to one or more remote computers/client devices, such as a remote computing device 880. The remote computing device 880 may be a wearable time keeping device, a personal computer, a handheld device, a server, a router, a network PC, a peer device or other common network node, and typically includes many or all of the elements described above relative to the computing system 810. The logical connections depicted in FIG. 7 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computing system 810 is connected to the LAN 871 through a network interface or adapter 870, which can be a Bluetooth or Wi-Fi adapter. When used in a WAN networking environment, the computing system 810 typically includes a modem 872, e.g., a wireless network, or other means for establishing communications over the WAN 873, such as the Internet. The wireless modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 7 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to FIG. 13. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel.

Network Environment

FIG. 6 illustrates a diagram of a network environment in which the wearable time keeping device and techniques described herein may be applied. The network environment 600 has a communications network 620 that connects server computing systems 604A through 604C, and at least one or more client computing systems 602A to 602F. As shown, there may be many server computing systems 604A through 604C and many client computing systems 602A to 602F connected to each other via the network 620, which may be, for example, the Internet. Note, that alternatively the network 620 might be or include one or more of: an optical network, a cellular network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 602A and the server computing system 604A can both initiate and respond to communications, their communication may be viewed as peer-to-peer. Likewise, communications between the server computing systems 604A and 604-B, and the client computing systems 602A and 602C may be viewed as peer-to-peer if each such communicating device is capable of initiation and response to communication. Additionally, server computing systems 604A-604C also have circuitry and software to communication with each other across the network 620. One or more of the server computing systems 604A to 604C may be associated with a database such as, for example, the databases 606A to 606C. Each server may have one or more instances of a virtual server running on that physical server and multiple virtual instances may be implemented by the design. A firewall may be established between a client computing system 602C and the network 620 to protect data integrity on the client computing system 602C. Each server computing system 604A-604C may have one or more firewalls.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud-based site is given a virtual amount of dedicated space and bandwidth in the cloud. Cloud applications can be different from other applications in their scalability which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device as well as a web-browser application resident on the client device. The cloud-based remote access for a wearable time keeping device, can be accessed by a mobile device, a desktop, a tablet device, and other similar devices, anytime, anywhere. Thus, the cloud-based remote access to a wearable time keeping device hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable time keeping device, and 5) combinations of these.

In an embodiment, the server computing system 604A may include a server engine, a web page management component, a content management component, and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, when executed on the server computing system 604A, causes the server computing system 604A to display windows and user interface screens on a portion of a media space, such as a web page. A user via a browser from the client computing system 602A may interact with the web page, and then supply input to the query/fields and/or service presented by a user interface of the application. The web page may be served by a web server computing system 604A on any Hypertext Markup Language (HTML) or Wireless Access Protocol (WAP) enabled client computing system 602A or any equivalent thereof. For example, the client mobile computing system 602A may be a wearable time keeping device, smart phone, a touch pad, a laptop, a netbook, etc. The client computing system 602A may host a browser to interact with the server computing system 604A. Each application has a code scripted to perform the functions that the software component is coded to carry out such as presenting fields and icons to take details of desired information. Algorithms, routines, and engines within the server computing system 604A take the information from the presenting fields and icons and put that information into an appropriate storage medium such as a database. A comparison wizard is scripted to refer to a database and make use of such data. The applications may be hosted on the server computing system 604A and served to the browser of the client computing system 602A or directly to an app running on the client computing system 602A. The applications then serve pages that allow entry of details and further pages that allow entry of more details.

Scripted Code

Any application and other scripted code components may be stored on a non-transitory computing machine-readable medium which, when executed on the machine causes the machine to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as applications etc. being executed by a computing device. Generally, programs include routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Some portions of the detailed descriptions herein are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this design have been fully described with reference to the accompanying drawings, it is to be noted that various changes and modifications will become apparent to those skilled in the art. Such changes and modifications are to be understood as being included within the scope of embodiments of this design as defined by the appended claims. For example, the device may include a barometer inside the housing of the device that also makes use of the microphone sealing component with one or more channels with the water resistant material for reasons of mechanical robustness as well as the pressure equalization benefit. Alternatively, the device may act as a barometer with the microphone seal with one or more channels to allow the sensed pressure internally in the device, the device uses this internal pressure to detect current depth of the device by the pressure. The invention is to be understood as not limited by the specific embodiments described herein, but only by scope of the appended claims.

What is claimed is:

1. A method of making metal component parts for a watch, including one or more types of metal component parts being one or more of i) a casing, ii) a bezel, iii) a buckle, or iv) parts for a watch band, with a Metal Injection Molding (MIM) process, comprising:

making a first instance of a first type of metal component part for a first watch design derived from a first instance of a MIM blank formed from an injection molding tool, in which at least a portion of the first instance of the MIM blank formed for the first type of metal component part is removed in accordance with a first Computer Numerical Control (CNC) sequence of a subtractive CNC milling process to form an interim shape and geometry of the first instance of the first type of component part for a first watch design; and making a second instance of the first type of metal component part for a second watch design derived from a second instance of the MIM blank, in which at least a portion of the second instance of the MIM blank formed for the first type of metal component part is removed in accordance with a second CNC sequence of the subtractive CNC milling process to form an interim shape and geometry of the second instance of the first type of component part for a second watch design different than the first watch design, wherein the subtractive CNC milling process is applied to both the first instance of the MIM blank for the first type of component part when the first instance of the MIM blank has not yet been sintered and hardened to a finished shape and geometry of the first instance of the first type of metal component part for the first watch design and the second instance of the MIM blank for the first type of component part when the second instance of the MIM blank has not yet been sintered and hardened to a finished shape and geometry of the second instance of the first type of metal component part for the second watch design.

2. The method of making metal component parts for the watch of claim 1,
wherein the finished geometry and shape of the first instance of the first type of metal component part differs from the finished shape and geometry of the second instance of the first type of metal component part even though the first instance of the first type of metal component and the second instance of the second type of metal component are formed from of the same MIM blank formed from the same injection molding tool.

3. The method of making metal component parts for the watch of claim 1, where the first type of metal component part is the casing and the first instance and the second instance of the first type of metal component part are two casings with different finished shapes and geometries, and
applying the first CNC sequence for the subtractive CNC milling process to the first instance of the MIM blank to remove or shape portions of the casing of the first watch design with the CNC milling process to form the interim shape and geometry of the casing of the first watch design when the casing of the first watch design has not yet been sintered, and
applying the second CNC sequence for the subtractive CNC milling process to the second instance of the MIM blank to remove or shape portions of the second instance of the watch casing with the CNC milling process, when the second instance of the watch casing has not yet been sintered, to form the interim shape and geometry of the second instance of the watch casing for the second watch design, and
where the geometry and shape of the casing in the second watch design differs from the geometry and shape of the casing in the first watch design.

4. The method of making metal component parts for the watch of claim 1, further comprising:
where the first type of metal component part is the bezel,
forming a first instance of the bezel with the same injection molding tool for the first watch design from the first instance of the MIM blank with the MIM process, and then creating at least a portion of an interim shape and geometry of the first bezel for the first watch design with the subtractive CNC milling process when the first instance of the MIM blank has not yet been sintered to harden a finished shape and geometry of the first bezel;
forming a second instance of the bezel with the same injection molding tool for a second watch design from a second instance of the MIM blank with the MIM process, and then creating at least a portion of an interim shape and geometry of the second bezel for the second watch design with the subtractive CNC milling process when second instance of the MIM blank has not yet been sintered to harden a finished shape and geometry of the second instance of the bezel; and
sintering the shape and geometry of the second instance of the bezel for the second watch design to achieve the finished shape and geometry of the second instance of the bezel for the second watch design.

5. The method of making metal component parts for the watch of claim 4, further comprising:
using both i) a cut die in addition to ii) the subtractive CNC milling process to further form the interim shape and geometry of the first instance of the bezel for the first watch design when the first instance of the bezel has not yet been sintered.

6. The method of making metal component parts for the watch of claim 4, further comprising:
using both i) a press in addition to ii) the subtractive CNC milling process to form the interim shape and geometry of the second bezel for the second watch design when the second bezel part has not yet been sintered.

7. The method of making metal component parts for the watch of claim 4, further comprising:
using a subsequent process to remove any extraneous material from the finished shape and geometry of the second bezel for the second watch design after the finished shape and geometry of the second bezel has been sintered to harden in order to achieve a final hardened shape and geometry of the second bezel.

8. The method of making metal component parts for the watch of claim 1, further comprising:
forming the first instance of the MIM blank for the first type of metal component part with an injection molding step with the same injection molding tool, where the component metal parts for the watch are formed for two or more different watch designs that fit within the constraints of a size and shape of the instances of the same MIM blank and then are derived from instances of the same MIM blank using at least the CNC milling process to achieve two different finished shapes and geometries of the component metal parts.

9. A watch with a printed circuit board module that contains a sensor, a battery, buttons, being put into a watch body with the metal component parts that are created and formed by the method of claim 1.

10. A watch with one or more springs and gears configured to control movement of hands on a watch face, where the springs and gears are put into a watch body with the metal component parts that are created and formed by the method of claim 1.

11. A method of making metal component parts for a watch, including one or more types of metal component parts being one or more of i) a casing, ii) a bezel, iii) a buckle, or iv) parts for a watch band, with a Metal Injection Molding (MIM) process, comprising:
- making a first instance of a first type of metal component part for a first watch design derived from a first instance of a MIM blank formed from an injection molding tool, in which at least a portion of the first instance of the MIM blank formed for the first type of metal component part is removed in accordance with a first sequence of a milling process to form an interim shape and geometry of the first instance of the first type of component part for a first watch design; and
- making a second instance of the first type of metal component part for a second watch design derived from a second instance of the MIM blank, in which at least a portion of the second instance of the MIM blank formed for the first type of metal component part is removed in accordance with a second sequence of the milling process to form an interim shape and geometry of the second instance of the first type of component part for a second watch design different than the first watch design,
- wherein the milling process is applied to both the first instance of the MIM blank for the first type of component part when the first instance of the MIM blank has not yet been sintered and hardened to a finished shape and geometry of the first instance of the first type of metal component part for the first watch design and the second instance of the MIM blank for the first type of component part when the second instance of the MIM blank has not yet been sintered and hardened to a finished shape and geometry of the second instance of the first type of metal component part for the second watch design.

12. The method of making metal component parts for the watch of claim 11, wherein the finished geometry and shape of the first instance of the first type of metal component part differs from the finished shape and geometry of the second instance of the first type of metal component part even though the first instance of the first type of metal component and the second instance of the second type of metal component are formed from the same MIM blank formed from the same injection molding tool.

13. The method of making metal component parts for the watch of claim 11, where the first type of metal component part is the casing and the first instance and the second instance of the first type of metal component part are two casings with different finished shapes and geometries, and
- applying the first sequence for the milling process to the first instance of the MIM blank to remove or shape portions of the casing of the first watch design with the milling process to form the interim shape and geometry of the casing of the first watch design when the casing of the first watch design has not yet been sintered, and
- applying the second sequence for the milling process to the second instance of the MIM blank to remove or shape portions of the second instance of the watch casing with the milling process, when the second instance of the watch casing has not yet been sintered, to form the interim shape and geometry of the second instance of the watch casing for the second watch design, and
- where the geometry and shape of the casing in the second watch design differs from the geometry and shape of the casing in the first watch design.

14. The method of making metal component parts for the watch of claim 11, further comprising:
- where the first type of metal component part is the bezel,
- forming a first instance of the bezel with the same injection molding tool for the first watch design from the first instance of the MIM blank with the MIM process, and then creating at least a portion of an interim shape and geometry of the first bezel for the first watch design with the milling process when the first instance of the MIM blank has not yet been sintered to harden a finished shape and geometry of the first bezel;
- forming a second instance of the bezel with the same injection molding tool for a second watch design from a second instance of the MIM blank with the MIM process, and then creating at least a portion of an interim shape and geometry of the second bezel for the second watch design with the milling process when second instance of the MIM blank has not yet been sintered to harden a finished shape and geometry of the second instance of the bezel; and
- sintering the shape and geometry of the second instance of the bezel for the second watch design to achieve the finished shape and geometry of the second instance of the bezel for the second watch design.

15. The method of making metal component parts for the watch of claim 14, further comprising:
- using both i) a cut die in addition to ii) the milling process to further form the interim shape and geometry of the first instance of the bezel for the first watch design when the first instance of the bezel has not yet been sintered.

16. The method of making metal component parts for the watch of claim 14, further comprising:
- using both i) a press in addition to ii) the milling process to form the interim shape and geometry of the second bezel for the second watch design when the second bezel part has not yet been sintered.

17. The method of making metal component parts for the watch of claim 14, further comprising:
- using a subsequent process to remove any extraneous material from the finished shape and geometry of the second bezel for the second watch design after the finished shape and geometry of the second bezel has been sintered to harden in order to achieve a final hardened shape and geometry of the second bezel.

18. The method of making metal component parts for the watch of claim 11, further comprising:
- forming the first instance of the MIM blank for the first type of metal component part with an injection molding step with the same injection molding tool, where the component metal parts for the watch are formed for two or more different watch designs that fit within the constraints of a size and shape of the instances of the same MIM blank and then are derived from instances of the same MIM blank using at least the milling process to achieve two different finished shapes and geometries of the component metal parts.

* * * * *